Patented Aug. 23, 1932

1,873,513

UNITED STATES PATENT OFFICE

CHRISTIAAN van LOON, OF DORDRECHT, NETHERLANDS, ASSIGNOR TO NAAMLOOZE VENNOOTSCHAP ANTON JURGENS MARGARINEFABRIEKEN, OF NIJMEGEN, NETHERLANDS PROCESS FOR CONVERTING NEUTRAL OR NEARLY NEUTRAL TRIGLYCERIDES, MUTUALLY OR WITH OTHER ESTERS No Drawing. Application filed January 5, 1925. Serial No. 692.

The invention relates to an improved process for the mutual conversion of triglycerides.

In order to prepare neutral triglycerides one may esterify glycerol with free fatty acids. Alternatively one may start with a neutral triglyceride and substitute its fatty acid radicals by treatment with other acids. By treatment of a neutral triglyceride with an alcohol the esters of the alcohol with the acid radicals are formed and glycerol is liberated. For instance a triglyceride, when treated with ethyl alcohol may be changed into the ethyl esters of the fatty acid radicals and free glycerol. Or by treatment of a triglyceride with for instance butyric acid, the butyric acid radical can be introduced into the triglyceride molecule, a corresponding quantity of the original fatty acids of the glyceride, being liberated simultaneously. The reaction of glycerol-monobenzoate, when converted into a mixture of glycerol-dibenzoate and glycerol, is analogous to the interaction of an alcohol and a neutral triglyceride; a fatty acid radical migrates from a neutral glyceride-group to a free alcoholic hydroxyl group. In all these reactions either free alcoholic hydroxyl groups or free carboxyl groups or both, take part in the reaction.

It is to be noted that the carboxyl group contains the hydroxyl group and the reactions contemplated such as acidolysis, esterification and alcoholysis are reactions in which the hydroxyl group is affected.

Apart from these well-known reactions stands the mutual conversion of triglycerides, in which neither free hydroxyl groups nor carboxyl groups take a part. Schematically this reaction may be formulated in this way:

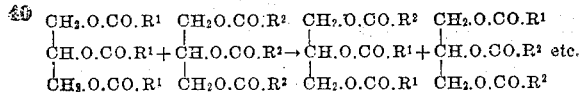

(In this equation .CO.R¹ and .CO.R² represent acid radicals) but the reaction may occur as well intramolecularly between the different ester-groups of a mixed triglyceride. In contradistinction to the first named reactions, this conversion takes place between triglycerides and is not dependent on the presence of either water (as with hydrolysis) or of free fatty acids (as with acidolysis and esterification) or of free alcohol groups (as with alcoholysis and esterification). About this conversion between triglycerides very little is known especially as regards suitable catalysts.

I have experimentally ascertained that the mutual conversion of neutral triglycerides proceeds at such an extremely slow rate, even at temperatures of 250-300° C., that it does not come to an end in many hours or even days. If for instance a mixture of 20 parts of beef stearine and 80 parts of soya bean oil is heated in an atmosphere of carbon dioxide at 275° C., the melting point will only be lowered after several hours:

|  | Degrees centigrade |
|---|---|
| The original m. p. of the mixture was | 42.5 |
| After 8 hours heating at 275° | 39.8 |
| After 16 hours heating at 275° | 36.1 | and still the reaction has not come to an end.

According to my invention the mutual conversion of triglycerides, may be effected in a much shorter time or at a much lower temperature, or both, by adding the same or such-like substances, as have a catalytic effect in the esterification of free fatty acids and free alcohol-groups or in the action of a free fatty acid or a free alcohol on a triglyceride namely such substances e. g. as: aromatic or aliphatic-aromatic sulphonic acids; metals like cadmium, lead, tin and zinc and their compounds; compounds of the alkali metals or of the alkaline earth metals, etc. or mixtures of these catalysts. With some of these catalysts it is profitable to use them in a finely divided state, or in any other known way e. g. precipitated on a carrier, and to stir during the reaction.

It further appeared according to the invention that the reaction may be advantageously performed under reduced pressure and/or in an atmosphere of inert gases though it should be understood that under higher pressures than atmospheric pressure good results may also be obtained.

The invention renders it possible to effect in an economic technical way an interchange of the fatty acid radicals of fats and oils, under such conditions and in such a short time, that the properties of these substances (colour, taste, odour, etc.) are not impaired. By this interchange the melting point, solidifying point, etc. of fats or of mixtures of fats are changed, whereas those characteristics which represent a mean value for all radicals present (saponification value, iodine value, etc.) remain substantially unaltered. This process for the interchange of alcohol or acid radicals represents a great improvement from a technical point of view, as it is not longer necessary to first hydrolyze or to alcoholyze the fats and to subsequently esterify them, and also because it is not necessary to work in apparatus, which are acid-proof.

In the case of volatile components one of course may use differences in volatility to push the conversion further than the equilibrium would permit.

The process may be applied to triglycerides in a neutral or nearly neutral condition, that is, triglycerides containing either no free fatty acids or a small percentage of free fatty acids.

Crude fats and oils containing a percentage of free fatty acids may be subjected to the conversion, (if a catalyst is used which is not destroyed by the free fatty acids before it reacts) but in several cases it is advantageous to have said conversion preceded or followed by, or combined with known processes for treating fats or oils, such as for instance hardening or refining. The conversion may be continued till the state of equilibrium is reached or stopped earlier, according to the requirements the product has to meet. In order to demonstrate the activity of the catalysts, the following examples are given:

*Examples*

1. Cocoabutter was heated for 2 hours at 200° C., under reduced pressure and while stirring, after the addition of 0.9% of sodium ethylate. After filtration the properties of the resulting fat are very different from those of the cocoabutter, as may be seen from the following figures:

|  | Melting point | Solidifying point |
|---|---|---|
| The original cocoabutter | 31.3° C. | 27.3° C. |
| After heating for 2 hrs. at 200° with 0.9% sodium ethylate | 39.7° C. | 23.2° C. |

If cocoabutter is heated under the same conditions, but in the absence of a catalyst, the figures remain practically unaltered: m. p. 31.5° C. solidifying p. 27.8° C.

2. A mixture of 25 parts of tristearine and 75 parts of soya bean oil was heated for one hour at 225° with 1.5% of a stannous hydroxide in an atmosphere of hydrogen and under stirring.

|  | Melting point | Solidifying point |
|---|---|---|
| The original mixture | 60.1° C. | 55.8° |
| After mutual conversion | 30-33° C. | 12.8° |

I claim:

1. A process for the mutual conversion of triglycerides in a neutral or nearly neutral condition comprising heating said triglycerides in the presence of an alholysis catalyst selected from a group consisting of cadmium, lead, tin, zinc, compounds of cadmium, lead, tin and zinc, and compounds of the alkali metals, compounds of the alkaline earth metals.

2. A process for the mutual conversion of triglycerides in a neutral or nearly neutral condition comprising heating said triglycerides in the presence of an acidolysis catalyst selected from a group consisting of cadmium, lead, tin, zinc, compounds of cadmium, lead, tin and zinc, compounds of the alkali metals and, compounds of the alkaline earth metals.

3. A process for the mutual conversion of triglycerides in a neutral or nearly neutral condition comprising heating said triglycerides in the presence of an esterification catalyst selected from a group consisting of cadmium, lead, tin, zinc, compounds of cadmium, lead, tin and zinc, compounds of the alkali metals, and compounds of the alkaline earth metals.

4. A process for the mutual conversion of triglycerides in a neutral or nearly neutral condition comprising heating said triglycerides in the presence of an alcoholysis catalyst selected from a group consisting of cadmium, lead, tin, zinc, compounds of cadmium, lead, tin and zinc, compounds of the alkali metals, and compounds of the alkaline earth metals under sub-atmospheric pressure.

5. A process for the mutual conversion of triglycerides in a neutral or nearly neutral condition comprising heating said triglycerides in the presence of an acidolysis catalyst selected from a group consisting of cadmium, lead, tin, zinc, compounds of cadmium, lead, tin and zinc, compounds of the alkali metals, and compounds of the alkaline earth metals under sub-atmospheric pressure.

6. A process for the mutual conversion of triglycerides in a neutral or nearly neutral condition comprising heating said triglycerides in the presence of an esterification catalyst selected from a group consisting of cadmium, lead, tin, zinc, compounds of cadmium, lead, tin and zinc, compounds of the alkali metals, and compounds of the alkaline earth metals under sub-atmospheric pressure.

7. A process for the mutual conversion of triglycerides in a neutral or nearly neutral condition comprising heating said triglycerides in the presence of an alcoholysis catalyst selected from a group consisting of cadmium, lead, tin, zinc, compounds of cadmium, lead, tin and zinc, compounds of the alkali metals, and compounds of the alkaline earth metals in the presence of inert gases.

8. A process for the mutual conversion of triglycerides in a neutral or nearly neutral condition comprising heating said triglycerides in the presence of an acidolysis catalyst selected from a group consisting of cadmium, lead, tin, zinc, compounds of cadmium, lead, tin and zinc, compounds of the alkali metals, and compounds of the alkaline earth metals in the presence of inert gases.

9. A process for the mutual conversion of triglycerides in a neutral or nearly neutral condition comprising heating said triglycerides in the presence of an esterification catalyst selected from a group consisting of cadmium, lead, tin, zinc, compounds of cadmium, lead, tin and zinc, compounds of the alkali metals, and compounds of the alkaline earth metals in the presence of inert gases.

10. A process for the mutual conversion of triglycerides in a neutral or nearly neutral condition comprising heating said triglycerides in the presence of a catalyst selected from a group consisting of tin and compounds of tin.

11. A process for the mutual conversion of triglycerides in a neutral or nearly neutral condition comprising heating said triglycerides in the presence of tin.

12. A process for the mutual conversion of triglycerides in a neutral or nearly neutral condition comprising heating said tryglycerides in the presence of a catalyst selected from a group consisting of tin and compounds of tin under sub-atmospheric pressure.

13. A process for the mutual conversion of triglycerides in a neutral or nearly neutral condition comprising heating said triglycerides in the presence of tin under sub-atmospheric pressure.

14. A process for the mutual conversion of triglycerides in a neutral or nearly neutral condition comprising heating said triglycerides in the presence of an alcoholysis catalyst selected from a group consisting of cadmium, lead, tin, zinc, compounds of cadmium, lead, tin and zinc, compounds of the alkali metals, and compounds of the alkaline earth metals under sub-atmospheric pressure and in the presence of inert gases.

15. A process for the mutual conversion of tryglycerides in a neutral or nearly neutral condition comprising heating said triglycerides in the presence of an acidolysis catalyst selected from a group consisting of cadmium, lead, tin, zinc, compounds of cadmium lead, tin and zinc, compounds of the alkali metals, and compounds of the alkaline earth metals under sub-atmospheric pressure and in the presence of inert gases.

16. A process for the mutual conversion of triglycerides in a neutral or nearly neutral condition comprising heating said triglycerides in the presence of an esterification catalyst selected from a group consisting of cadmium, lead, tin, zinc, compounds of cadmium, lead, tin and zinc, compounds of the alkali metals, and compounds of the alkaline earth metals under sub-atmospheric pressure and in the presence of inert gases.

17. A process for the mutual conversion of triglycerides in a neutral or nearly neutral condition comprising heating said triglycerides in the presence of a catalyst from a group consisting of tin and compounds of tin under sub-atmospheric pressure and in the presence of inert gases.

18. A process for the mutual conversion of triglycerides in a neutral or nearly neutral condition comprising heating said triglycerides in the presence of tin under sub-atmospheric pressure and in the presence of inert gases.

19. A process for the mutual conversion of triglycerides in a neutral or nearly neutral condition comprising heating said triglycerides in the presence of a catalyst selected from a group consisting of cadmium, lead, tin, zinc, compounds of cadmium, lead, tin and zinc, compounds of the alkali metals and compounds of the alkaline earth metals under atmospheric pressure.

20. A process for the mutual conversion of triglycerides in a neutral or nearly neutral condition comprising heating said triglycerides in the presence of a catalyst from a group consisting of tin and compounds of tin under atmospheric pressure.

21. A process for the mutual conversion of triglycerides in a neutral or nearly neutral condition comprising heating said triglycerides in the presence of tin under atmospheric pressure.

In testimony whereof I affix my signature.

CHRISTIAAN van LOON.